(12) United States Patent
Okawara et al.

(10) Patent No.: US 9,501,102 B2
(45) Date of Patent: Nov. 22, 2016

(54) METHOD OF MANUFACTURING SURFACE PANEL

(71) Applicant: ALPS ELECTRIC CO., LTD., Tokyo (JP)

(72) Inventors: Shinji Okawara, Niigata-ken (JP); Hajime Katono, Niigata-ken (JP); Mitsuru Tokuta, Niigata-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/004,784

(22) Filed: Jan. 22, 2016

(65) Prior Publication Data

US 2016/0139632 A1    May 19, 2016

Related U.S. Application Data

(62) Division of application No. 13/401,758, filed on Feb. 21, 2012, now Pat. No. 9,335,871.

(30) Foreign Application Priority Data

Mar. 30, 2011   (JP) ................. 2011-075459

(51) Int. Cl.
| | |
|---|---|
| *G06F 1/16* | (2006.01) |
| *B29C 45/14* | (2006.01) |
| *G06F 3/041* | (2006.01) |
| *G06F 3/044* | (2006.01) |
| *B29K 33/00* | (2006.01) |
| *B29L 31/34* | (2006.01) |

(52) U.S. Cl.
CPC ....... *G06F 1/1643* (2013.01); *B29C 45/14811* (2013.01); *B29C 45/14836* (2013.01); *G06F 1/1656* (2013.01); *G06F 3/044* (2013.01);

(Continued)

(58) Field of Classification Search
None
See application file for complete search history.

(56) References Cited

U.S. PATENT DOCUMENTS

| | | | |
|---|---|---|---|
| 8,263,211 B2 | 9/2012 | Nishimura | |
| 2008/0024462 A1* | 1/2008 | Kim ............... | G06F 1/1626 345/174 |

(Continued)

FOREIGN PATENT DOCUMENTS

| | | |
|---|---|---|
| JP | 2005-339856 | 12/2005 |
| JP | 2009-130283 | 6/2009 |

(Continued)

OTHER PUBLICATIONS

Notification of Reason for Refusal dated May 1, 2012 from Application No. 2011-075459.

(Continued)

*Primary Examiner* — Seokyun Moon
*Assistant Examiner* — Douglas M Wilson
(74) *Attorney, Agent, or Firm* — Beyer Law Group LLP

(57) ABSTRACT

A method manufactures a front panel including a front panel body formed of a single transmissive resin layer and a sensor film attached thereto, using a first mold having a molding recessed portion and a second mold having a molding projecting portion. The first and second molds are joined together such that a cavity is formed between the molding recessed portion and the molding projecting portion, by placing the sensor film between the first mold and the second mold, on the molding projecting portion in the cavity. A melted resin is injected into the cavity to form the single transmissive resin layer having a front surface formed in a shape of the molding recessed portion, and a back surface formed along the sensor film in a shape of the molding projecting portion, thereby laminating the sensor film to the back surface of the transmissive resin layer.

8 Claims, 13 Drawing Sheets

(52) U.S. Cl.
CPC ......... *G06F3/0412* (2013.01); *B29K 2033/12* (2013.01); *B29L 2031/3475* (2013.01); *G06F 2203/04103* (2013.01)

(56) References Cited

U.S. PATENT DOCUMENTS

| | | | | |
|---|---|---|---|---|
| 2010/0159183 | A1* | 6/2010 | Nishimura | B29C 45/14639 428/77 |
| 2011/0221702 | A1* | 9/2011 | Tanaami | H01H 13/807 345/174 |
| 2011/0255227 | A1* | 10/2011 | Murakami | B32B 1/00 361/679.01 |
| 2012/0019475 | A1* | 1/2012 | Li | G06F 3/044 345/174 |
| 2012/0242585 | A1* | 9/2012 | Jones | G06F 3/044 345/173 |

FOREIGN PATENT DOCUMENTS

| | | |
|---|---|---|
| JP | 2010-244772 | 10/2010 |
| WO | WO 2008/149789 | 12/2008 |
| WO | WO 2010/064545 | 10/2010 |

OTHER PUBLICATIONS

Office Action dated Jun. 9, 2014 from U.S. Appl. No. 13/401,758.
Final Office Action dated Dec. 17, 2014 from U.S. Appl. No. 13/401,758.
Office Action dated Jun. 1, 2015 from U.S. Appl. No. 13/401,758.
Final Office Action dated Sep. 11, 2015 from U.S. Appl. No. 13/401,758.
Notice of Allowance dated Jan. 14, 2016 from U.S. Appl. No. 13/401,758.

* cited by examiner

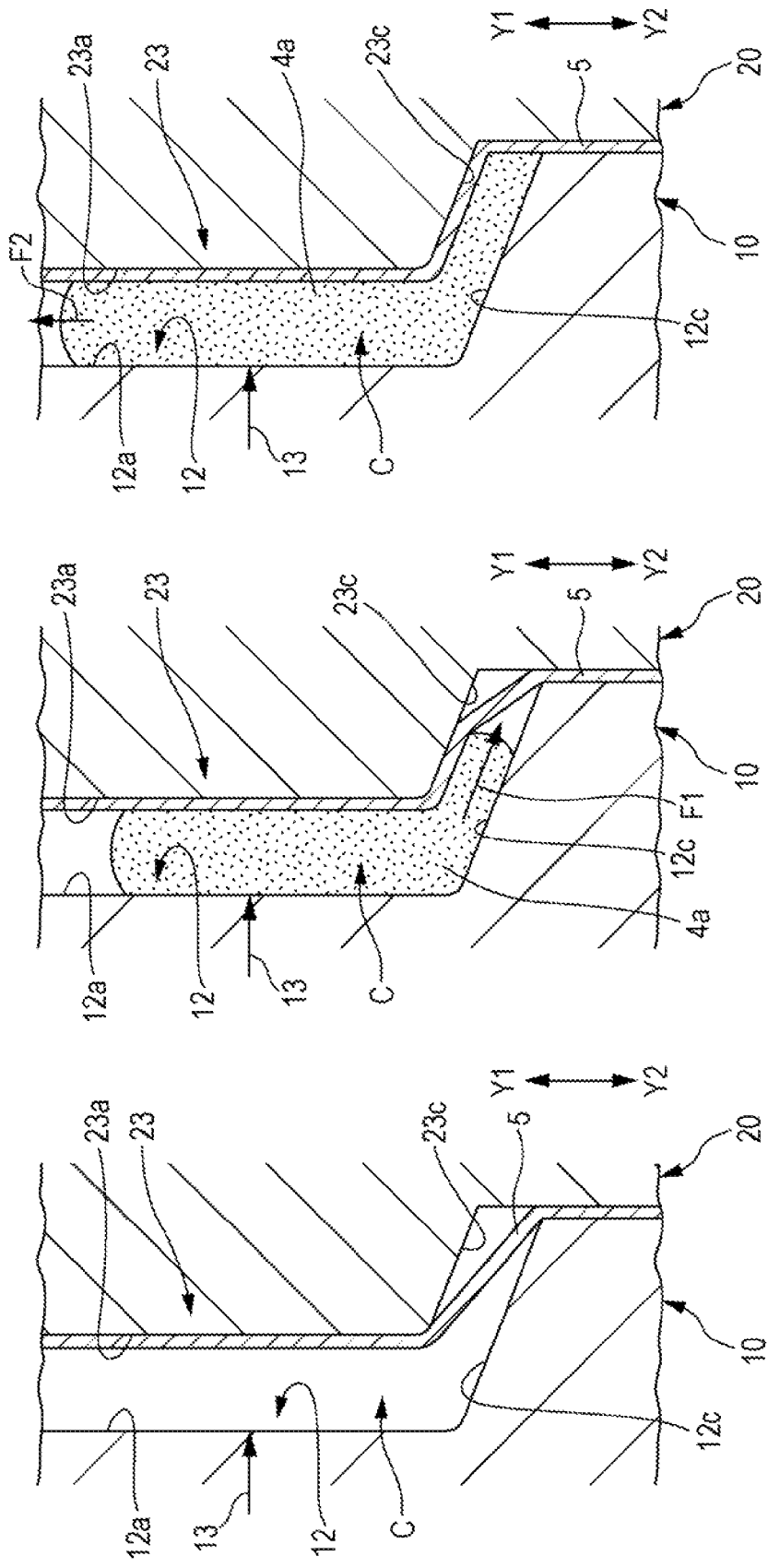

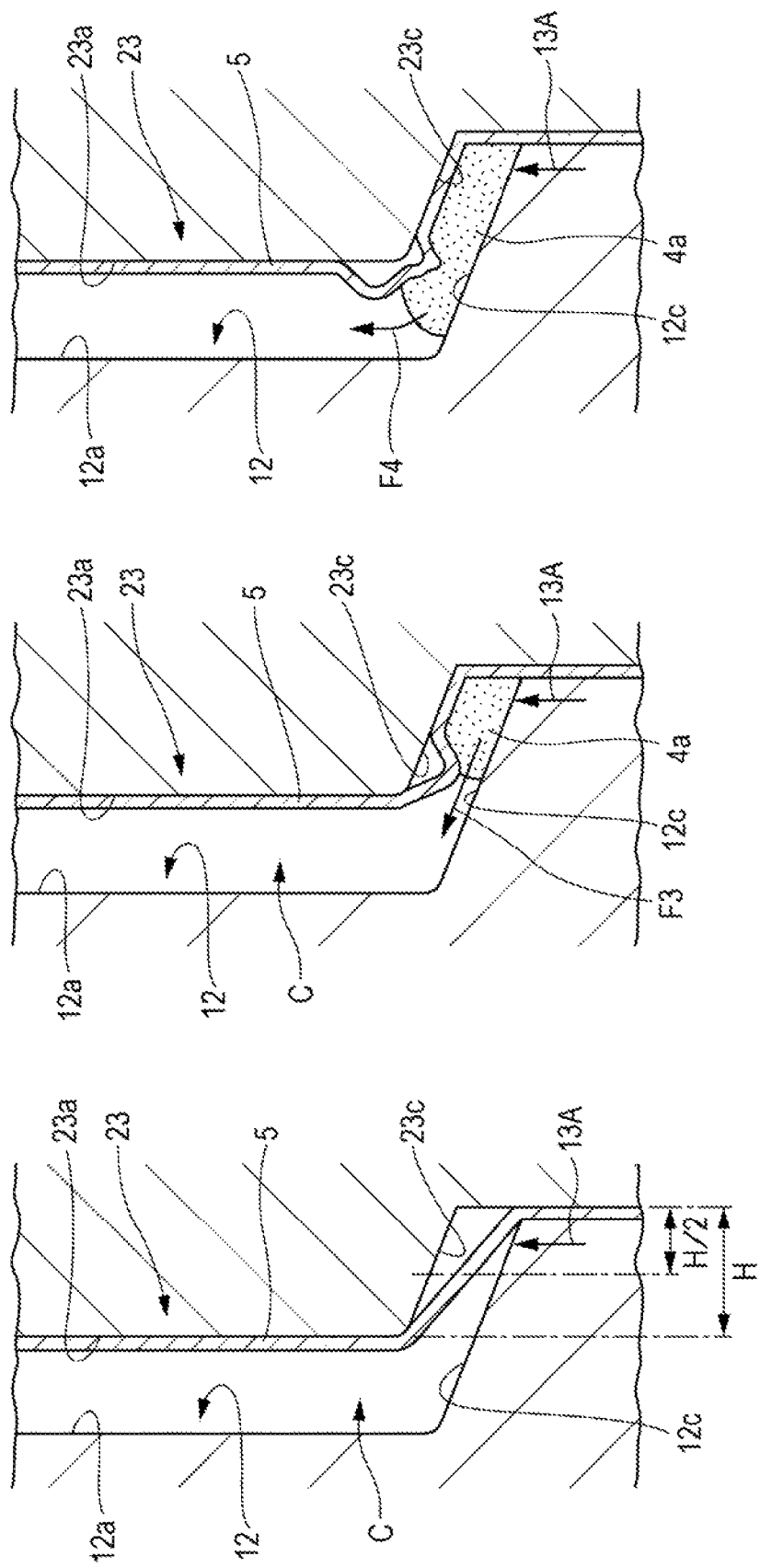

METHOD OF MANUFACTURING SURFACE PANEL

CLAIM OF PRIORITY

This application is a Divisional of U.S. patent application Ser. No. 13/401,758 filed on Feb. 21, 2012, which claims benefit of Japanese Patent Application No. 2011-075459 filed on Mar. 30, 2011, which are hereby incorporated by reference.

BACKGROUND OF THE INVENTION

1. Field of the Invention

The present invention relates to a surface panel mounted on a mobile device or other electronic devices and including a decorative layer and a touch sensor portion. The present invention particularly relates to a surface panel that can secure a wide display region and a sensing region in which a touch sensor portion performs sensing, and to a method of manufacturing the surface panel.

2. Description of the Related Art

A surface panel mounted on a mobile device or other electronic devices has a transmissive region through which a display screen, such as a liquid crystal display panel, can be seen and on which a touch operation is digitally performed, in its center portion. A frame-shaped colored decorative portion is mounted on the periphery of the transmissive region.

In a surface panel and with a method of manufacturing the surface panel described in Domestic Re-publication of PCT International Publication for Patent Application No. WO2008/149789, a capacitive touch sensor is stacked on a back surface of a glass substrate via a transparent pressure sensitive adhesive layer. By placing the glass substrate in a mold and injecting a melted resin into the mold, a frame-shaped decorative portion made of a synthetic resin is fixedly attached to the periphery of the glass substrate.

In an outer casing and with a method of manufacturing the outer casing described in Japanese Unexamined Patent Application Publication No. 2009-130283, a first film and a second film are included. The first film includes a light transmissive portion, a frame-shaped decorative portion surrounding the light transmissive portion, and a touch display portion formed on part of the decorative portion. The second film has electrodes of a touch sensor formed thereon. After the first and second films are preformed so as to follow the outline of the outer casing, the first and second films are placed in a mold, and a transparent resin material is injected into a space between the first and second films, and molded. Thus, part of the outer casing is formed.

The surface panel according to Domestic Re-publication of PCT International Publication for Patent Application No. WO2008/149789 is advantageous in that the transmission quality of display light is favorable since a light transmissive region is formed by the glass substrate. However, since the surface panel includes the frame-shaped decorative portion made of a synthetic resin at the outer periphery of the glass substrate, the area of the light transmissive region and a sensing region, in which the touch sensor can perform sensing, is very small. Moreover, an injection molding has to be performed by positioning an assembly of the glass substrate and the touch sensor inside the mold. Thus, the method of manufacturing the surface panel is complex.

In the outer casing described in Japanese Unexamined Patent Application Publication No. 2009-130283, a touch sensor is disposed on a region that is different from a light transmissive portion. Thus, a user cannot perform an input operation by directly touching a display portion of the light transmissive portion with his/her finger. Moreover, since the light transmissive portion is disposed in a limited space on an upper side of the outer casing, a large screen cannot be displayed.

The method of manufacturing the surface panel according to Japanese Unexamined Patent Application Publication No. 2009-130283 involves two steps, which are a step of preforming the first and second films and a step of injecting a melted resin. Furthermore, the method is subject to limitation of accuracy of positioning the preformed first and second films inside the mold.

SUMMARY OF THE INVENTION

The present invention is made to solve the above existing problems and provides a surface panel that can secure a transmissive region and a sensing region in which a sensor performs sensing, as large as possible on a front surface of the panel.

The present invention provides a method of manufacturing a surface panel with which a surface panel having a large transmissive region and a large sensing region in which a sensor performs sensing can be formed, and with which a sensor film including an electrode layer and a wiring layer can be highly accurately positioned without being creased and thus can be integrated with a resin layer.

According to an aspect of the present invention, a surface panel includes a transmissive resin layer and a sensor film sensing the presence of a human finger in proximity thereto. The resin layer and the sensor film are stacked one on top of the other. The resin layer has a front surface and a back surface. The front surface includes a front-surface front portion, a front-surface right portion to the right of the front-surface front portion, and a front-surface left portion to the left of the front-surface front portion. The back surface includes a back-surface front portion to the back of the front-surface front portion, a back-surface right portion to the back of the front-surface right portion, and a back-surface left portion to the back of the front-surface left portion. The front-surface front portion is used as an operation face or a display face. The front-surface right portion and the front-surface left portion have such surface shapes as to extend from the front-surface front portion to the rear. The sensor film includes a transmissive electrode layer and a wiring layer connected to the electrode layer. The sensor film is fixed to the back surface of the resin layer, the electrode layer is positioned on the back-surface front portion of the resin layer, and the wiring layer is positioned on at least one of the back-surface right portion and the back-surface left portion of the resin layer. The sensor film includes a decorative portion covering the wiring layer on a side that is closer to a front surface of the sensor film than the wiring layer is.

In the surface panel according to the aspect of the present invention, the front-surface right portion and the front-surface left portion that are disposed on the right and left of the front-surface front portion used as an operation face or a display face have such surface shapes as to extend from the front-surface front portion to the rear and the wiring layer is disposed to the back of at least one of the front-surface right portion and the front-surface left portion. Thus, a wide region of the front-surface front portion can be used as the transmissive region for display and a sensor region in which a sensor performs sensing.

Since the electrode layer is positioned on the back-surface front portion, a large area of the front-surface front portion can be used as a region for sensing a finger. According to the aspect of the present invention, the electrode layer is positioned on the back-surface front portion. However, the present invention does not exclude a structure in which part of the electrode layer made of ITO or the like extends to the back-surface right portion and the back-surface left portion. In this structure, part of the transmissive region surrounded by the decorative portion extends to the back-surface right portion and the back-surface left portion.

According to the above aspect, the sensor film may include a window portion and the decorative portion on a front surface side thereof and the electrode layer and the wiring layer on a back surface side thereof, the decorative portion may have a shape of a frame surrounding the window portion, and the wiring layer may be positioned on a back surface of the decorative portion. The front surface of the sensor film may be closely attached to the back surface of the resin layer, the window portion may be positioned on the back-surface front portion, and the decorative portion may be positioned on the back-surface right portion and the back-surface left portion.

According to the above aspect, the electrode layer preferably is a transmissive conductive organic layer and the conductive organic layer is preferably extended to at least one of the back-surface right portion and the back-surface left portion.

The transmissive conductive organic layer has such a property as to follow the shape of the sensor film when the conductive organic layer is bent together with the sensor film. Thus, the conductive organic layer easily follows the bent shape of the back-surface front portion of the surface panel or the bent shape of the back-surface right portion and the back-surface left portion of the surface panel.

Consequently, the sensor region or the transmissive region can be brought to be as close as possible to the back-surface right portion and the back-surface left portion. Furthermore, part of the sensor region or the transmissive region can be extended to at least one of the back-surface right portion and the back-surface left portion.

According to another aspect of the present invention, provided is a method of manufacturing a surface panel including a transmissive resin layer and a sensor film stacked one on top of the other by using a first mold having a molding recessed portion and a second mold having a molding projecting portion, the sensor film sensing the presence of a human finger in proximity thereto. The method includes the steps of placing a sensor film prior to a molding process between the first mold and the second mold, the sensor film including a transmissive electrode layer and a wiring layer on a back surface side thereof and a decorative portion on a front surface side thereof, the wiring layer being connected to the electrode layer, the decorative portion covering the wiring layer, fitting the first mold and the second mold together and forming a cavity in which the sensor film is placed between the molding recessed portion and the molding projecting portion, and injecting a melted resin into the cavity to form a transmissive resin layer, forming a front-surface front portion, a front-surface right portion, and a front-surface left portion on the resin layer with the molding recessed portion, forming a back-surface front portion to the back of the front-surface front portion, a back-surface right portion to the back of the front-surface right portion, and a back-surface left portion to the back of the front-surface left portion with the molding projecting portion, closely attaching the sensor film to a back surface of the resin layer, positioning the electrode layer on the back-surface front portion, and positioning the wiring layer on at least one of the back-surface right portion and the back-surface left portion, the front-surface right portion and the front-surface left portion being located on the right and left of the front-surface front portion and having such surface shapes as to extend from the front-surface front portion to the rear.

With the method according to the above aspect, the sensor film can be closely attached to the resin layer with simple steps of placing a sensor film prior to a molding process in the molds and injecting a melted resin into the molds. The sensor film including the decorative portion and the electrode layer is closely attached to the back surface side of the molded surface panel, which has a recessed shape, and thus a sensor film is not exposed to the atmosphere through the front surface of the surface panel. Thus, the decorative portion does not come off or is not damaged even though a user touches the front surface of the surface panel with his/her finger.

With the method according to the above aspect, the sensor film may be pressed in the cavity against a front surface of the molding projecting portion by a pressure with which the melted resin is injected, and an outer peripheral portion of the sensor film positioned outside the cavity between the first mold and the second mold may be allowed to be elongated by the pressure and heat.

With the method according to the above aspect, the sensor film is not completely restrained between the first mold and the second mold and thus is allowed to be elongated between the first mold and the second mold. Thus, when the sensor film is pressed against the molding projecting portion of the second mold by the melted resin injected into the cavity, the sensor film is less likely to become creased.

With the method according to the above aspect, the cavity is preferably disposed such that a length direction of the cavity orthogonal to a direction in which the first mold and the second mold face each other coincides with a direction of gravity. A gate formed in the first mold is preferably positioned to be lower than a vertical middle point of the cavity.

When the cavity is vertically disposed and the gate is positioned at a lower portion of the first mold, the melted resin injected into the cavity gradually rises inside the cavity. Thus, the sensor film can be closely attached to a front surface of the molding projecting portion without being creased.

In the surface panel according to the present invention, a transmissive region that transmits a display content and a sensing region in which a sensor performs sensing can be made as large as possible.

With the method of manufacturing a surface panel according to the present invention, the sensor film can be attached to the back surface of the resin layer so as to follow the shape of the back surface by mainly two steps, which are a step of fitting molds together and a step of injecting a melted resin. With this method, the sensor film is less likely to become creased, and the sensor portion, the decorative portion, and the resin layer can be easily positioned with respect to one another.

BRIEF DESCRIPTION OF THE DRAWINGS

FIGS. 13A, 13B, and 13C are enlarged views illustrating the state where a melted resin is injected into the cavity from a gate with a method of manufacturing a front surface plate according to an embodiment of the present invention; and FIGS. 14A, 14B, and 14C are enlarged views illustrating the state where a melted resin is injected into a cavity from a gate with a method of manufacturing a front surface plate according to a comparative example.

DESCRIPTION OF THE PREFERRED EMBODIMENTS

A surface panel 1 according to an embodiment is used as part of a casing of a mobile device, such as a mobile phone and a personal digital assistance.

Figure 1:
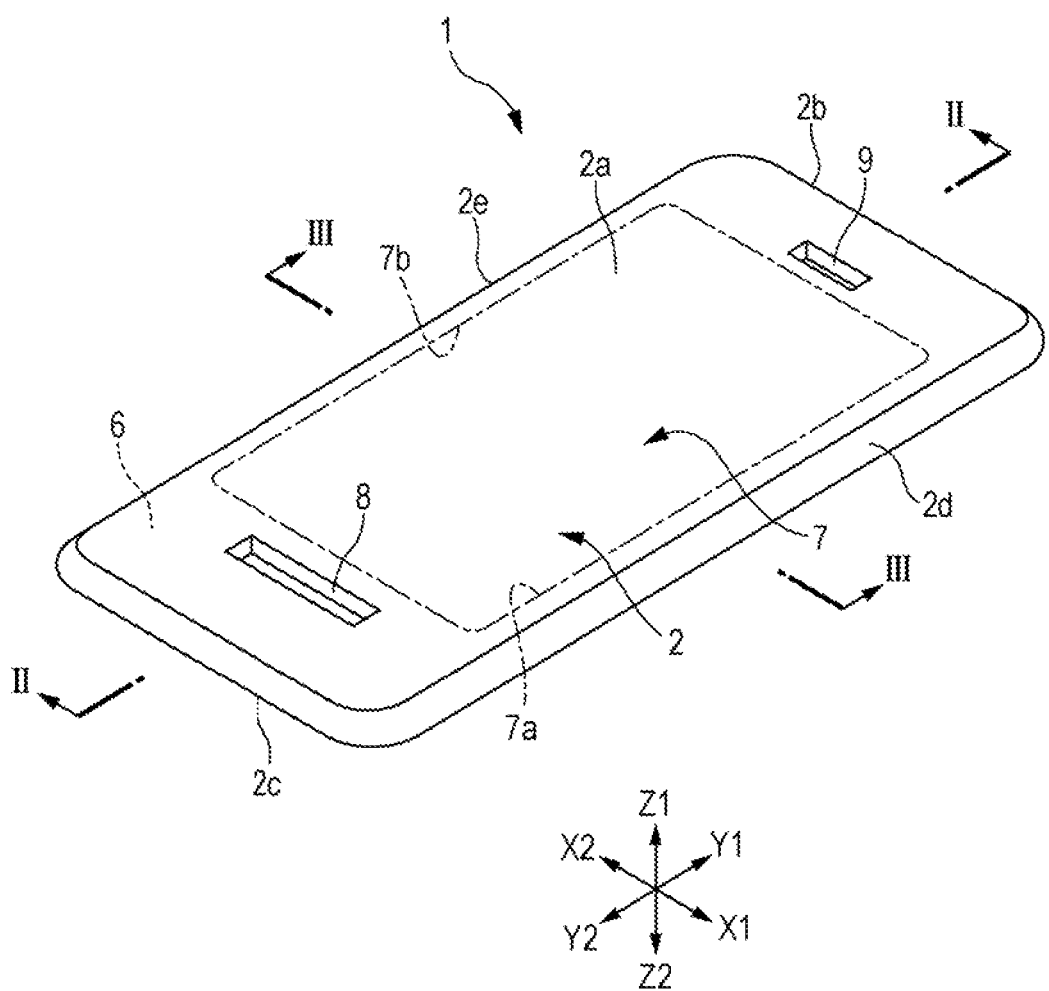
FIG. 1 is a perspective view illustrating a surface panel according to an embodiment of the present invention.
Figure 2:
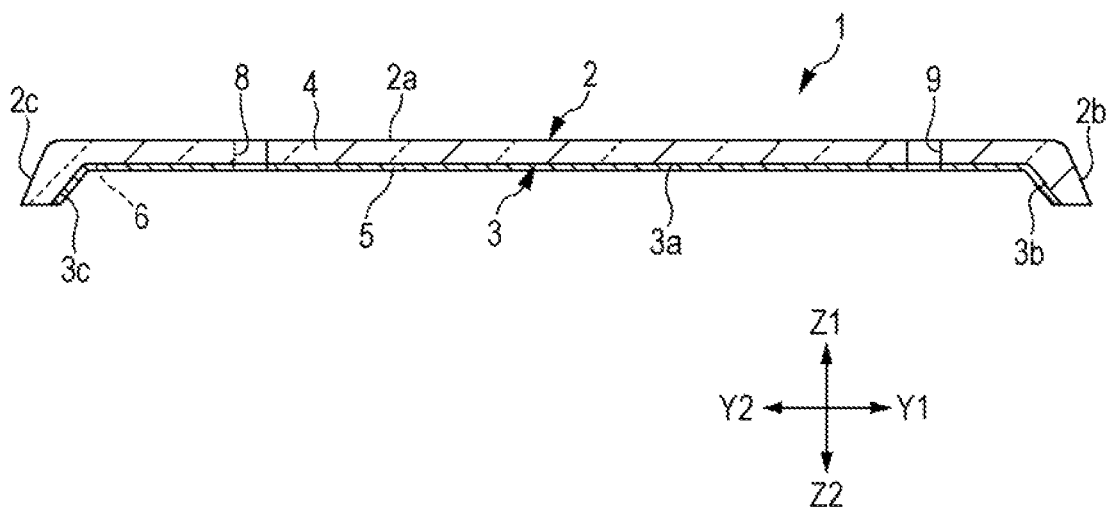
FIG. 2 is a sectional view of the surface panel illustrated in FIG. 1, taken along the line II-II.
Figure 3:
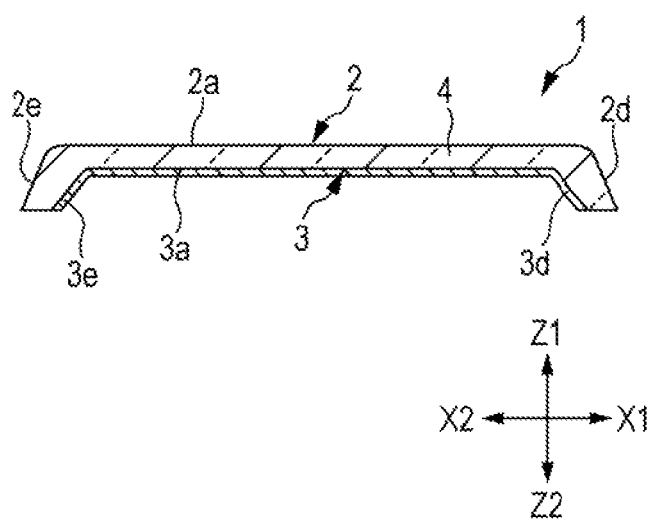
FIG. 3 is a sectional view of the surface panel illustrated in FIG. 1, taken along the line III-III.

As illustrated in FIGS. 1 to 3, a front surface 2 of the surface panel 1 has a projecting shape and a back surface 3 of the surface panel 1 has a recessed shape. The front surface 2 is disposed to the front of the casing of the mobile device (faces in the Z1 direction), and serves as an operation face or a display face. The back surface 3 faces rearward (in the Z2 direction), that is, toward the inside of the casing of the mobile device.

As illustrated in FIGS. 2 and 3, the surface panel 1 is formed by closely attaching a resin layer 4 and a sensor film 5 to each other. The resin layer 4 is seen on a side of the front surface 2 and the sensor film 5 is seen on a side of the back surface 3.

The front surface 2 of the resin layer 4 has a wide front-surface front portion 2a, which serves as a digitally operated operation face and a display face. The front-surface front portion 2a is substantially flat or has a curved shape so as to project to the front (in the Z1 direction).

A front-surface upper portion 2b is formed at a lengthwise upper end portion (an end portion in the Y1 direction) of the resin layer 4 and a front-surface lower portion 2c is formed at a lengthwise lower end portion (an end portion in the Y2 direction) of the resin layer 4. The front-surface upper portion 2b and the front-surface lower portion 2c have such surface shapes as to extend from the front-surface front portion 2a to the rear (in the Z2 direction). A front-surface right portion 2d is formed at a right end portion (an end portion in the X1 direction) of the resin layer 4 and a front-surface left portion 2e is formed at a left end portion (an end portion in the X2 direction) of the resin layer 4. The front-surface right portion 2d and the front-surface left portion 2e have such surface shapes as to extend from the front-surface front portion 2a to the rear.

The back surface 3 of the resin layer 4 includes a back-surface front portion 3a to the back of the front-surface front portion 2a, an back-surface upper portion 3b to the back of the front-surface upper portion 2b, a back-surface lower portion 3c to the back of the front-surface lower portion 2c, a back-surface right portion 3d to the back of the front-surface right portion 2d, and a back-surface left portion 3e to the back of the front-surface left portion 2e.

In the resin layer 4, a boundary between the front-surface front portion 2a and the front-surface upper portion 2b or the front-surface lower portion 2c and a boundary between the front-surface front portion 2a and the front-surface right portion 2d or the front-surface left portion 2e are disposed at positions at which the resin layer 4 has a front surface curvature or a front surface angle that is different from that of the front-surface front portion 2a. Likewise, a boundary between the back-surface front portion 3a and the back-surface upper portion 3b or the back-surface lower portion 3c and a boundary between the back-surface front portion 3a and the back-surface right portion 3d or the back-surface left portion 3e are disposed at positions at which the resin layer 4 has a front surface curvature or a front surface angle that is different from that of the back-surface front portion 3a.

Figure 5:
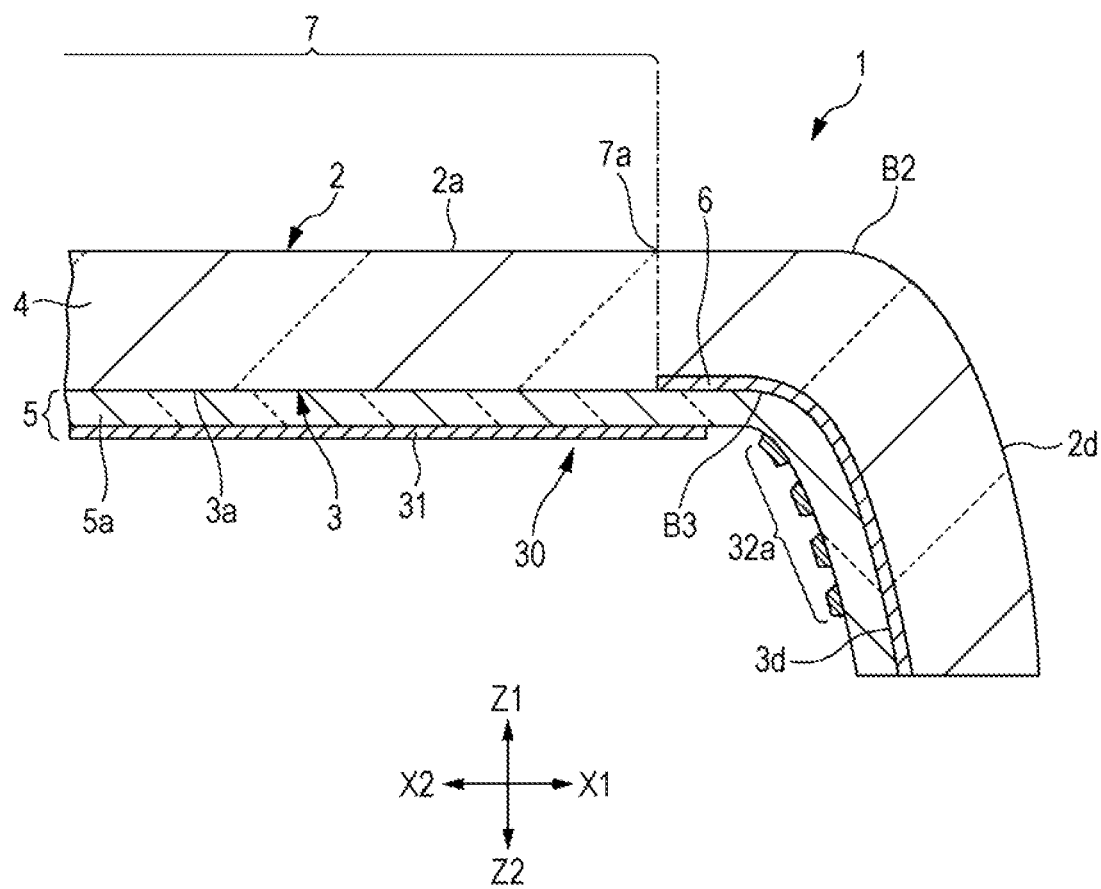
FIG. 5 is an enlarged view of part of the surface panel illustrated in FIG. 3.

FIG. 5, which is an enlarged view of part of the surface panel 1, illustrates a boundary B2 between the front-surface front portion 2a and the front-surface right portion 2d and a boundary B3 between the back-surface front portion 3a and the back-surface right portion 3d, which are defined on the basis of the above definition.

The resin layer 4 is made of a transmissive synthetic resin material such as an acrylic material, for example, polymethyl methacrylate (PMMA).

Figure 6:
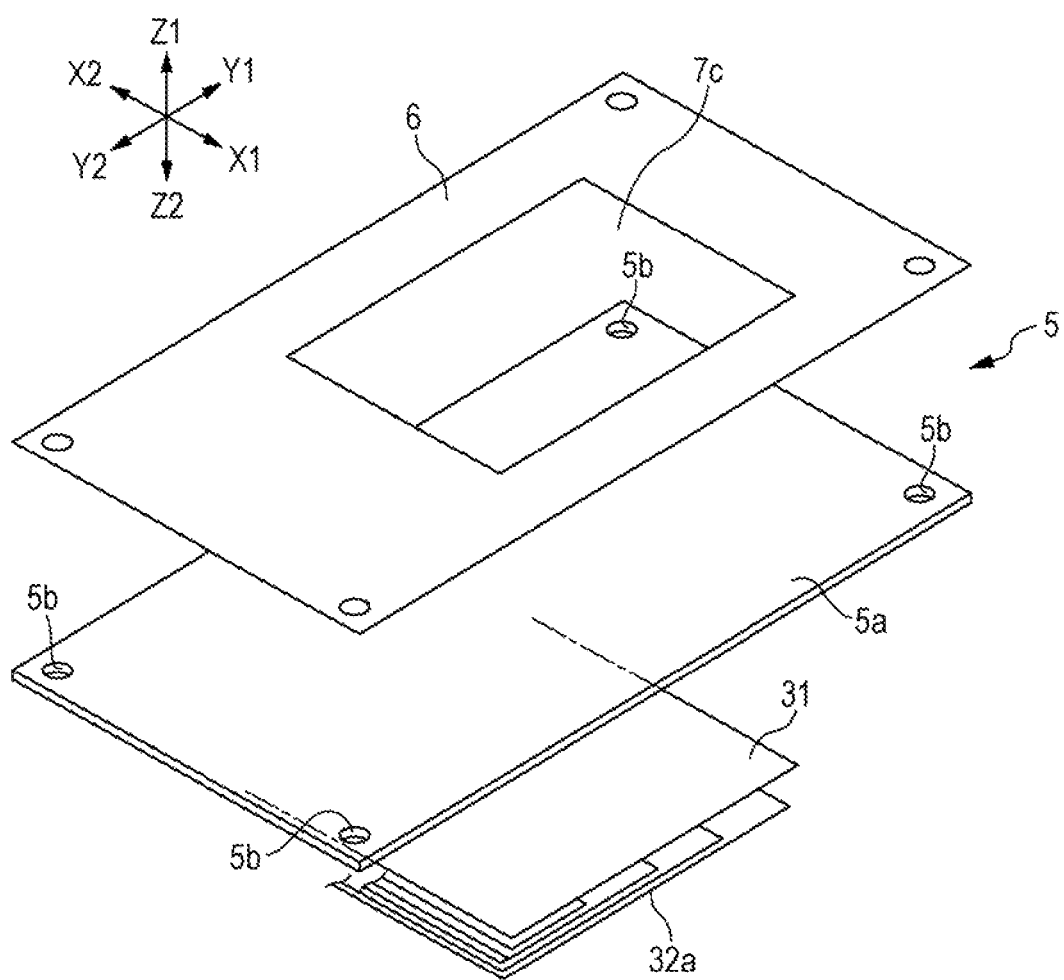
FIG. 6 is an exploded view illustrating the layered structure of a sensor film.

As illustrated in FIG. 5 and FIG. 6 (an exploded view illustrating the layered structure of the sensor film), a sensor film 5 includes a transmissive base film 5a, a decorative portion 6 formed on the front surface of the base film 5a, and a touch sensor portion 30 formed on the back surface of the base film 5a. The base film 5a of the sensor film 5 is a transmissive synthetic resin film. The base film 5a is made of polyethylene terephthalate (PET), which is a synthetic resin having a strength and heat resistance appropriate for forming the touch sensor portion 30. Cyclic polyolefin (COP) or the like can be employed, instead.

Herein, a material that is transmissive preferably means that the material has a total light transmittance of 90% or more, that is, the material is transparent. However, the total light transmittance may be lower than 90% as long as the material can transmit light therethrough, for example, the total light transmittance may be 60% or more.

Figure 4:
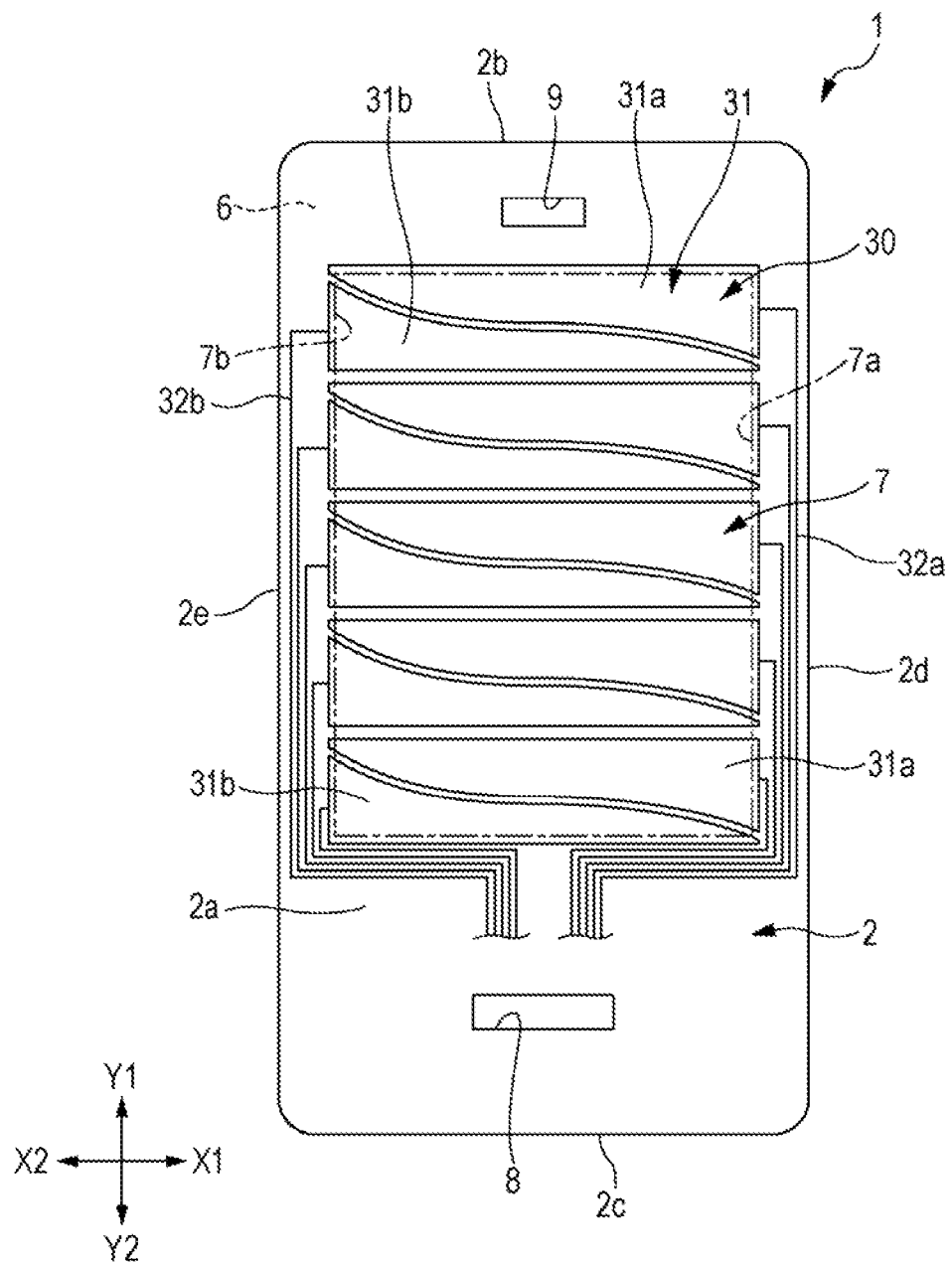
FIG. 4 is a front view of the surface panel illustrated in FIG. 1.

As illustrated in FIGS. 1 and 4, the decorative portion 6 formed on the front surface side of the sensor film 5 can be visually seen through the resin layer 4 from the front (in the Z1 direction). The decorative portion 6 has a hue based on a design of the surface panel 1 and has a frame shape. A region surrounded by the frame-shaped decorative portion 6 is a transmissive region 7. In the surface panel 1 illustrated in FIGS. 1 and 4, the transmissive region 7 is rectangular. The transmissive region 7 is positioned in a region of the back-surface front portion 3a of the resin layer 4. As illustrated in FIG. 5, a right edge portion 7a of the transmissive region 7 is positioned near the border B3 between the back-surface front portion 3a and the back-surface right portion 3d. A left edge portion 7b of the transmissive region 7 is positioned likewise.

As illustrated in FIGS. 4 and 5, the touch sensor portion 30 of the sensor film 5 includes multiple electrode layers 31, multiple right wiring layers 32a connected to the right of the electrode layers 31, and multiple left wiring layers 32b connected to the left of the electrode layers 31.

Figure 7:
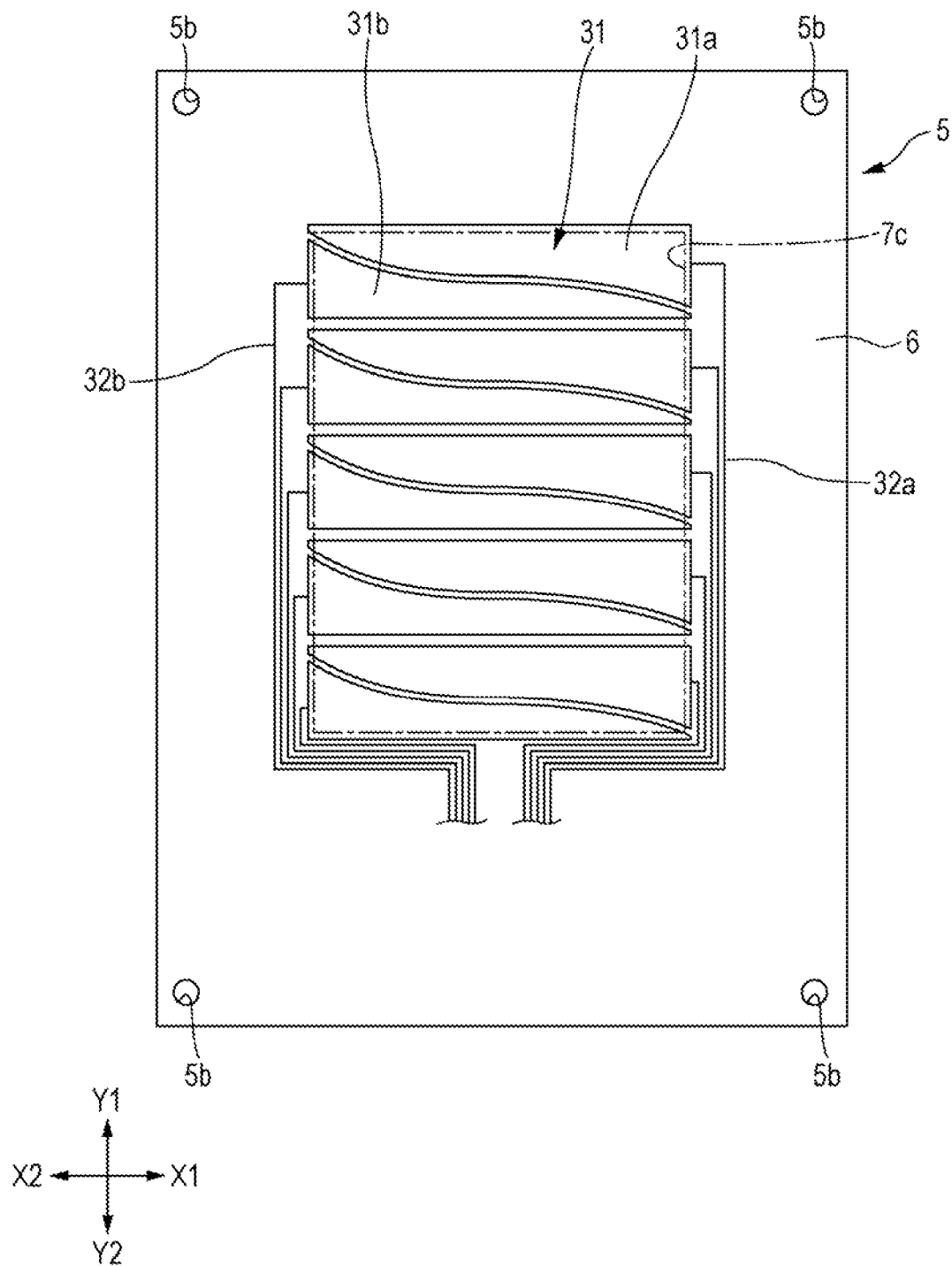
FIG. 7 is a perspective plan view of patterns of electrode layers and wiring layers on the back surface side of the sensor film.

As illustrated in FIG. 4 and FIG. 7 (a perspective plan view of patterns of the electrode layers 31 on the back surface side of the sensor film 5, seen from the front surface side), the electrode layers 31 are disposed in the transmissive region 7 surrounded by the frame-shaped decorative portion 6, and the right wiring layers 32a and the left wiring layers 32b are disposed at a back side of the decorative portion 6 so as to be hidden by the decorative portion 6.

Multiple pairs of right electrodes 31a and left electrodes 31b, each pair forming one electrode layer 31, are arranged side by side in the length direction (Y1-Y2 direction). The electrode layers 31 are made of indium tin oxide (ITO). The electrode layers 31 are formed by being deposited on the back surface of the base film 5a made of PET or the like, and then etching into the shapes of the right electrodes 31a and the left electrodes 31b.

The right wiring layers 32a are connected to the right electrodes 31a and the left wiring layers 32b are connected to the left electrodes 31b. The right wiring layers 32a and the left wiring layers 32b are conductive organic layers made of a binder resin containing a low-resistive conductor, such as silver paste, gold paste, or carbon paste. The conductive organic layers that the right and left wiring layers 32a and 32b are made of are more flexible than ITO that the electrode layers 31 are made of. Specifically, the conductive organic layers exhibit a higher elongation and curvature than ITO under the same load.

The right wiring layers 32a and the left wiring layers 32b are formed by depositing a conductive organic layer on an ITO layer on the back surface of the base film 5a and then forming patterns for the electrode layers 31, the right wiring layers 32a, and the left wiring layers 32b by etching. Thereafter, part of the conductive organic layer deposited on the front surface of the electrode layers 31 is removed by etching. Alternatively, the right wiring layers 32a and the left wiring layers 32b may be formed by a printing process.

As illustrated in FIG. 5, the sensor film 5 is bent so as to follow the shape of part of the resin layer 4 from the back-surface front portion 3a to the back-surface right portion 3d and is closely attached to the resin layer 4. The electrode layers 31 made of ITO are disposed within a region of the back-surface front portion 3a and thus are not greatly curved. On the other hand, a portion of the sensor film 5 that extends beyond, in the X1 direction, a region in which the electrode layers 31 are disposed is bent at a large curvature and the most part of the portion of the sensor film 5 is in close contact with the back-surface right portion 3d. The front side of the right wiring layers 32a is covered by the decorative portion 6. The left wiring layers 32b are covered likewise.

A portion of the sensor film 5 in which the right and left wiring layers 32a and 32b formed of the conductive organic layer are disposed is more easily bent than the region in which the electrode layers 31 made of ITO are disposed. The right and left wiring layers 32a and 32b easily follow flexure and are less likely to be damaged due to the flexure. For this reason, a portion of the sensor film 5 including at least part of the right wiring layers 32a or the left wiring layers 32b can be closely attached to the corresponding one of the back-surface right portion 3d and the back-surface left portion 3e. Alternatively, a portion of the sensor film 5 including all the right wiring layers 32a or the left wiring layers 32b can be closely attached to the corresponding one of the back-surface right portion 3d and the back-surface left portion 3e.

When at least part of the right wiring layers 32a or the left wiring layers 32b are disposed on the corresponding one of the back-surface right portion 3d and the back-surface left portion 3e, the area of the electrode layers 31 disposed on the back-surface front portion 3a can be increased. Consequently, it is possible to widen the transmissive region 7 and to bring the right edge portion 7a and the left edge portion 7b of the transmissive region 7 to be closer to the border B3 between the back-surface front portion 3a and the back-surface right portion 3d and a border between the back-surface front portion 3a and the back-surface left portion 3e. Furthermore, the right edge portion 7a and the left edge portion 7b of the transmissive region 7 can be positioned in a region on the back-surface right portion 3d and the back-surface left portion 3e beyond the border B3 and the border between the back-surface front portion 3a and the back-surface left portion 3e.

A mobile device employing the surface panel 1 includes a display device, such as a liquid crystal display panel, inside the casing, and a display screen of the display device faces the inner side of the transmissive region 7. When a user uses the mobile device, the user can see the display screen through the transmissive resin layer 4 and the base film 5a in the transmissive region 7. When the user touches, with his/her finger, the front-surface front portion 2a of the resin layer 4 in the transmissive region 7 through which the display screen can be seen, the touch sensor portion 30 changes its output in accordance with the capacitance between the finger and the corresponding one of the electrode layers 31, and thus can sense the point of the transmissive region 7 that is touched with the finger.

Since the transmissive region 7 in the surface panel 1 can be widened as much as possible within the region of the back-surface front portion 3a, the display area of the display screen and the area of the digitally operated operation region can be increased, accordingly.

As illustrated in FIG. 4, the right wiring layers 32a and the left wiring layers 32b are formed on the back surface of the base film 5a and extended in the Y2 direction. Part of the base film 5a is extended outward beyond the back-surface lower portion 3c and serves as a cable piece for wiring, and a land portion at a leading end of the cable piece can be connected to a connector mounted in the casing.

As illustrated in FIGS. 1 and 2, the surface panel 1 includes a first opening 8 and a second opening 9. The first opening 8 is disposed at a position that is lower (at a side in the Y2 direction) than a middle point of the surface panel 1 in the length direction (Y direction). The second opening 9 is disposed at a position that is higher (at a side in the Y1 direction) than the middle point. The first opening 8 and the second opening 9 penetrate through the resin layer 4 and the sensor film 5.

A microphone and a speaker are disposed inside the casing at such positions as to face the first opening 8 and the second opening 9. Thus, a sound corresponding to a speech operation, which is performed as a mobile phone, or a sound corresponding to an image displayed on the display screen can be output through the openings 8 and 9.

Now, a method of manufacturing the surface panel 1 will be described.

Figure 8:
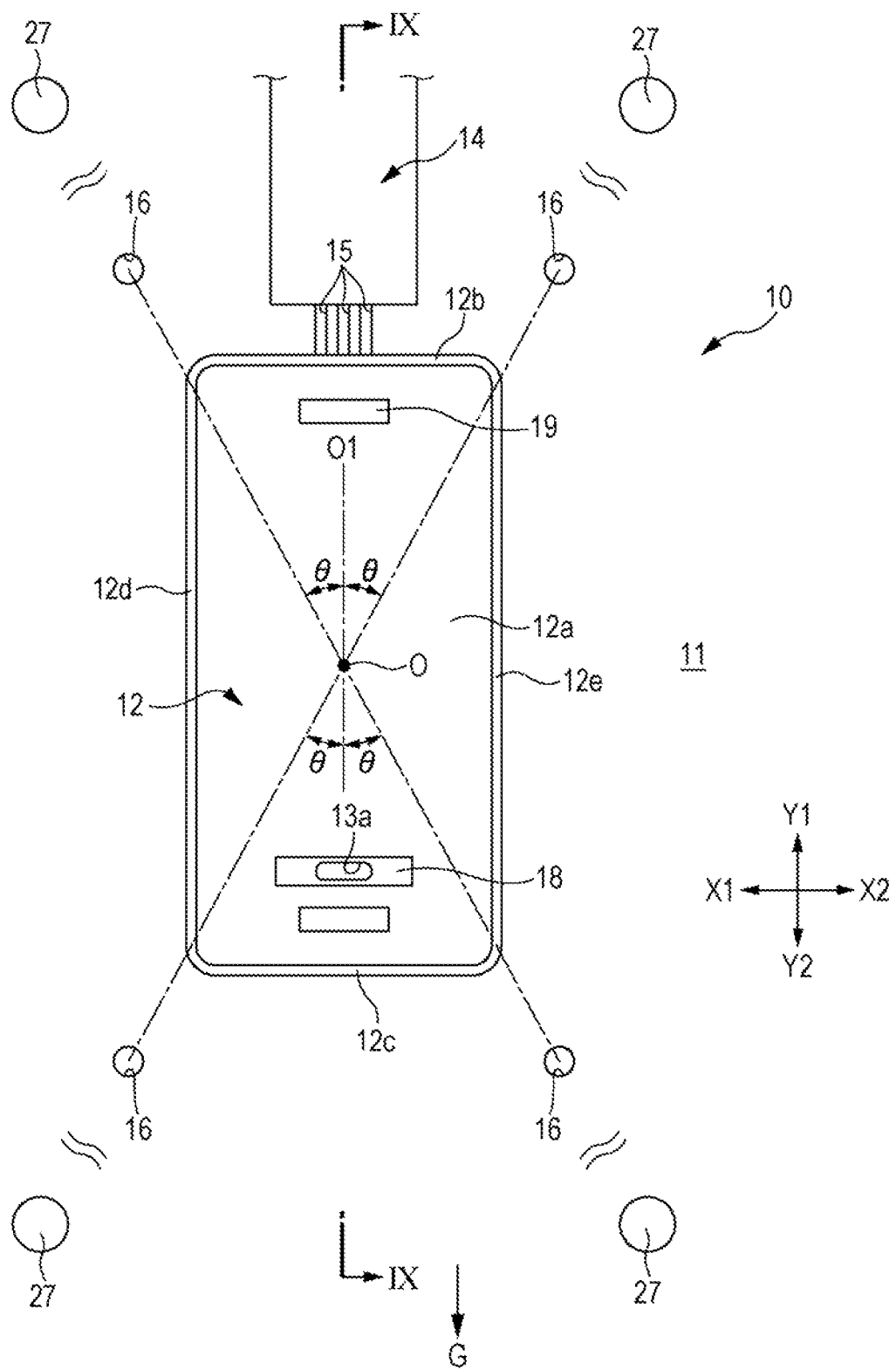
FIG. 8 is a front view of a first mold seen from a molding side.
Figure 9:
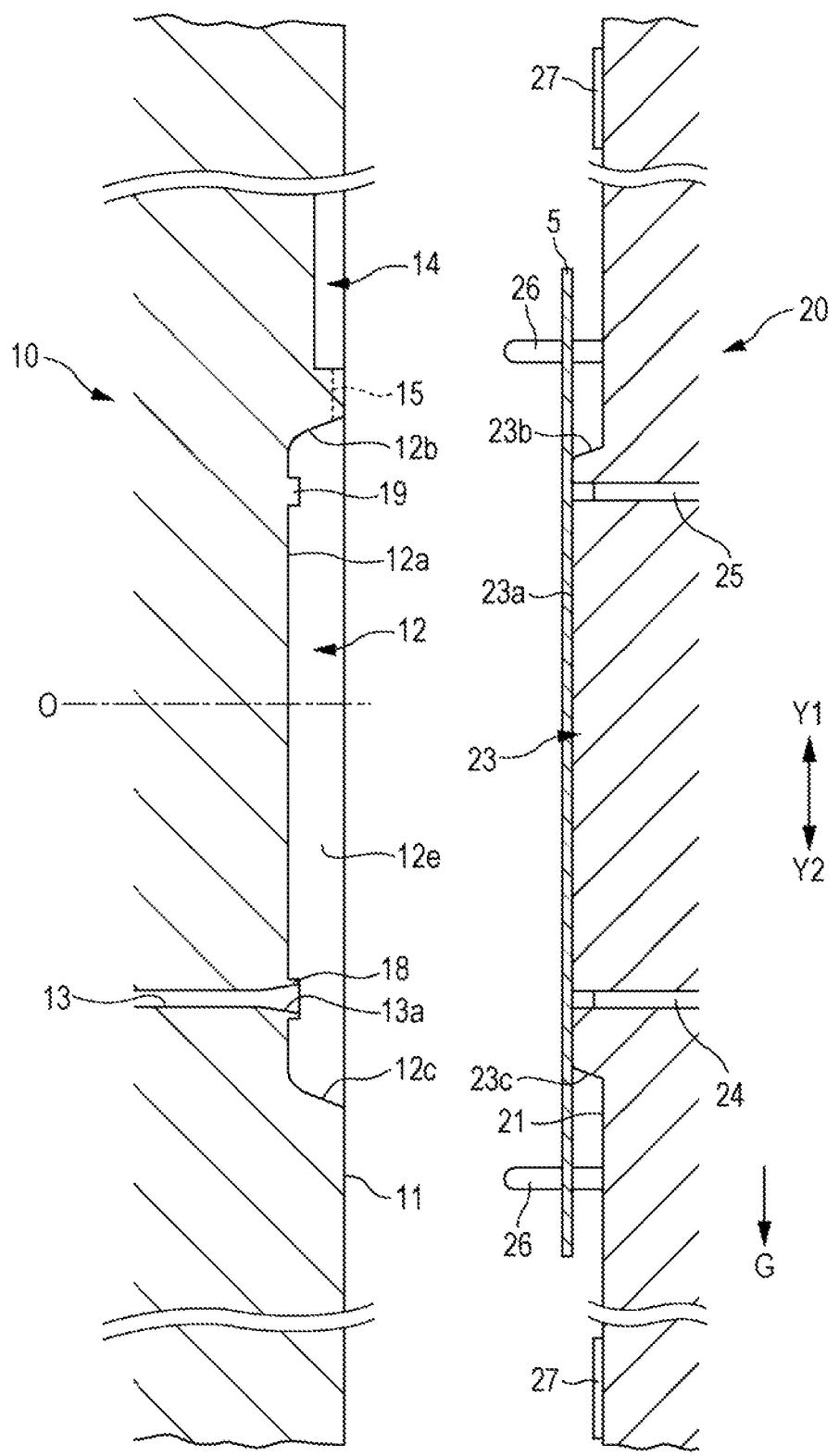
FIG. 9 is a sectional view of the first mold illustrated in FIG. 8 and a second mold, taken along the line IX-IX.

FIG. 8 illustrates a first mold 10 and FIG. 9 illustrates the first mold 10 and a second mold 20. The Y1-Y2 direction illustrated in FIGS. 8 and 9 and the X1-X2 direction illustrated in FIG. 8 correspond to the length direction (Y1-Y2 direction) and the width direction (X1-X2 direction) of the surface panel 1 to be formed. The first mold 10 and the second mold 20 are longitudinally placed such that the Y2 direction coincides with the direction of gravity (G direction).

The first mold 10 has an opposing flat face 11 that extends in the Y1-Y2 direction and that has a molding recessed portion 12 in a middle portion thereof. As illustrated in FIGS. 8 and 9, in the molding recessed portion 12, a bottom surface serves as a center-surface molding portion 12a for forming the front-surface front portion 2a of the resin layer 4, an end surface in the Y1 direction serves as an upper-surface molding portion 12b for forming the front-surface upper portion 2b, an end surface in the Y2 direction serves as a lower-surface molding portion 12c for forming the front-surface lower portion 2c, an end surface in the X1 direction serves as a right-surface molding portion 12d for forming the front-surface right portion 2d, and an end surface in the X2 direction serves as a left-surface molding portion 12e for forming the front-surface left portion 2e.

In the center-surface molding portion 12a, a rectangular first step portion 18 that corresponds to the first opening 8 is formed at a side in the Y2 direction, and a rectangular second step portion 19 that corresponds to the second opening 9 is formed at a side in the Y1 direction.

The first mold 10 has a gate (sprue gate) 13 and an opening end 13a of the gate 13 is open to the inside of the molding recessed portion 12 within a region of the first step portion 18. FIG. 9 illustrates a center O of the molding recessed portion 12 in the Y1-Y2 direction. The center O is a middle point between the upper-surface molding portion 12b and the lower-surface molding portion 12c. The gate 13 is positioned to be lower than the center O (at a side in the Y2 direction), and to be at a side in the Y2 direction with respect to a middle point between the center O and the lower-surface molding portion 12c.

As illustrated in FIGS. 8 and 9, the first mold 10 has a relief recess 14 at a side that is farther in the Y1 direction than the molding recessed portion 12. Multiple air-exit paths 15 are formed between the upper-surface molding portion 12b of the molding recessed portion 12 and the relief recess 14. The air-exit paths 15 are shallow grooves that are slightly recessed from the opposing flat face 11.

As illustrated in FIG. 8, clearance holes 16 are formed at four positions outside the molding recessed portion 12.

As illustrated in FIG. 9, the second mold 20 has an opposing flat face 21 that extends in the Y1-Y2 direction, and a molding projecting portion 23 that projects toward the first mold 10 is integrally formed in a center portion of the opposing flat face 21. In the molding projecting portion 23, a top portion serves as a center-back-surface molding portion 23a for forming the back-surface front portion 3a of the surface panel 1, an end surface in the Y1 direction serves as an upper-back-surface molding portion 23b for forming the back-surface upper portion 3b, and an end surface in the Y2 direction serves as a lower-back-surface molding portion 23c for forming the back-surface lower portion 3c. The molding projecting portion 23 also has a right-back-surface molding portion for forming the back-surface right portion 3d and a left-back-surface molding portion for forming the back-surface left portion 3e, which are not illustrated.

As illustrated in FIG. 9, a first release pin 24 and a second release pin 25 are mounted on the second mold 20 so as to be movable forward and backward. The first release pin 24 is disposed at such a position as to face the first step portion 18 of the first mold 10, and the second release pin 25 is disposed at such a position as to face the second step portion 19.

Positioning pins 26 are fixed to the second mold 20 at four positions outside the molding projecting portion 23. Each positioning pin 26 vertically projects from the opposing flat face 21. When the first mold 10 and the second mold 20 are fitted together, the positioning pins 26 are inserted into the clearance holes 16 of the first mold 10.

The positions of the positioning pins 26 and the positions of the clearance holes 16 correspond to each other. As illustrated in FIG. 8, the four positioning pins 26 are positioned equidistantly from the center O of the molding recessed portion 12. The center O is positioned at a point at which the molding recessed portion 12 is halved in the length direction (Y1-Y2 direction) and in the width direction (X1-X2 direction). The positioning pins 26 are positioned equidistantly from the center O and equiangularly (at an angle θ) with respect to a center line O1 that passes the center O and that extends in the longitudinal direction.

Note that all the positions of the positioning pin 26 and the clearance holes 16 do not have to be equidistant from the center O depending on the shape of the surface panel 1 to be formed, i.e., the shape of the molding recessed portion 12 and the molding projecting portion 23. For example, a positioning pin 26 at a side in the Y1 direction may be farther from the center O in the Y direction than a positioning pin 26 at a side in the Y2 direction. Here, it is preferable that an interval in the X direction between the two positioning pins 26 at a side in the Y1 direction be equal to an interval in the X direction between the two positioning pins 26 at a side in the Y2 direction.

Figure 10:
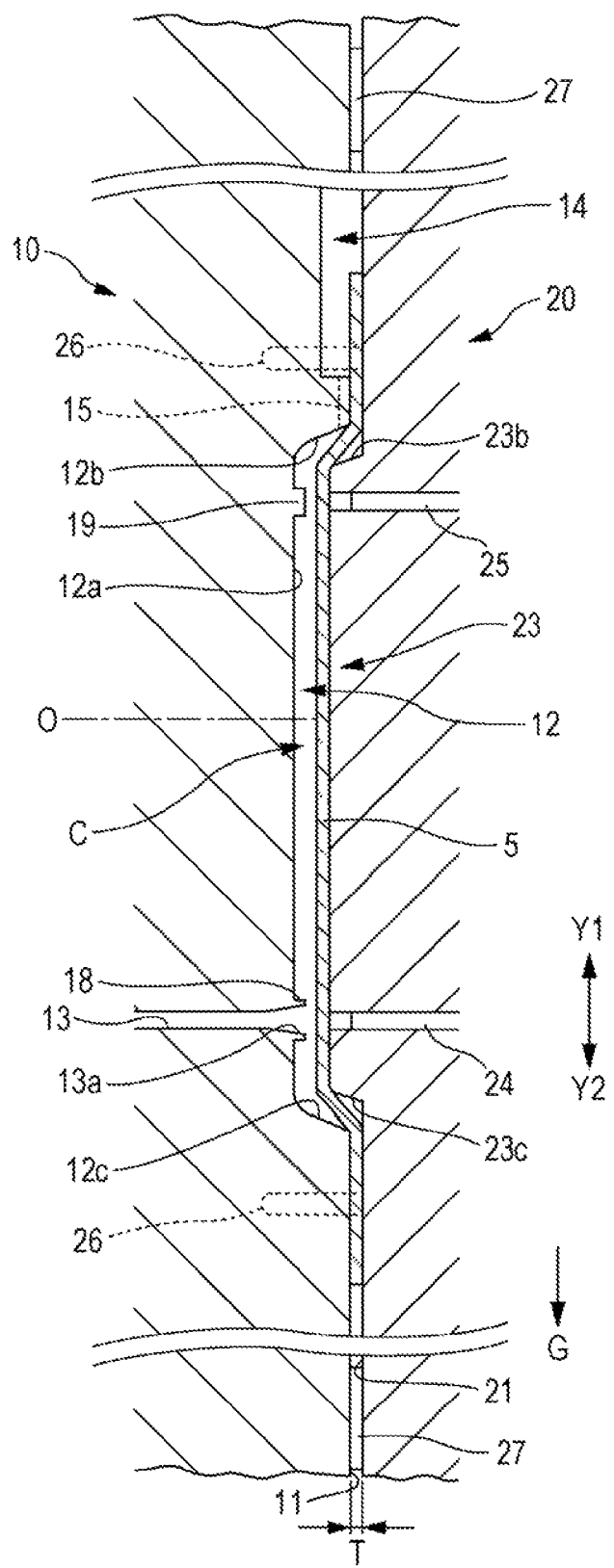
FIG. 10 is a sectional view illustrating a state where a sensor film prior to a molding process is inserted in a cavity and molds are fitted together.

As illustrated in FIG. 9, gap forming portions 27 project at multiple positions on the opposing flat face 21 of the second mold 20. As illustrated in FIG. 10, when the first mold 10 and the second mold 20 are fitted together, the gap forming portions 27 come into contact with the opposing flat face 11 of the first mold 10. Thus, an opposing gap T between the opposing flat face 11 of the first mold 10 and the opposing flat face 21 of the second mold 20 is defined. The opposing gap T has a thickness that is substantially equal to or slightly larger than the thickness of the sensor film 5. To be more specific, the thickness of the opposing gap T is not set such that the sensor film 5 is firmly nipped in the opposing gap T and is set such that the sensor film 5 can be elongated inside the opposing gap T when a stress is caused in the sensor film 5 due to the pressure from the melted resin.

The gap forming portions 27 may be formed on the opposing flat face 11 of the first mold 10, or both of the opposing flat face 11 and the opposing flat face 21.

FIG. 6 is an exploded perspective view illustrating the structure of a sensor film 5 prior to a molding process, and FIG. 7 is a perspective view of the sensor film 5 seen from the front.

In the sensor film 5, the frame-shaped decorative portion 6 is attached to the front surface of the base film 5a around a window portion 7c formed for forming the transmissive region 7 of the surface panel 1. The base film 5a has a thickness on the order of 0.05 to 0.5 mm. The decorative portion 6 is formed on the front surface of the base film 5a by coating. The decorative portion 6 is colored with a hue that expresses the appearance of the casing of an electronic device, and is formed of multiple coated color films. If a protective film having a separator function is stacked on the base film 5a, the thickness can be reduced to be lower than 0.05 mm.

The electrode layers 31, the right wiring layers 32a, and the left wiring layers 32b are formed on the back surface of the base film 5a. Each electrode layer 31 is formed by etching an ITO film so as to be divided into the right electrode 31a and the left electrode 31b. The right wiring layers 32a and the left wiring layers 32b are the conductive organic layers and are formed by etching, or may be formed by printing.

The untreated sensor film 5 is rectangular and has the positioning holes 5b at four corners.

As illustrated in FIG. 9, the sensor film 5 is mounted on the second mold 20 while the first mold 10 and the second mold 20 are being separated. The positioning pins 26 are inserted into the positioning holes 5b illustrated in FIGS. 6 and 7, and thus the sensor film 5 is positioned with respect to the second mold 20. The sensor film 5 is placed such that the front surface having the decorative portion 6 faces the first mold 10. The first mold 10 and the second mold 20 have been subjected to preheating in advance. The preheating temperature is higher than the room temperature but lower than the glass transition temperature of the base film 5a of the sensor film 5, for example, in a range of around 60 to 100° C.

As illustrated in FIG. 10, when the first mold 10 and the second mold 20 are fitted together, the positioning pins 26 projecting from the second mold 20 enter the inside of the clearance holes 16 of the first mold 10. Thus, the gap forming portions 27 of the second mold 20 come into contact with the opposing flat face 11 of the first mold 10 and the opposing gap T is defined as being between the opposing flat face 11 of the first mold 10 and the opposing flat face 21 of the second mold 20. Here, a cavity C is also defined as being between the molding recessed portion 12 of the first mold 10 and the molding projecting portion 23 of the second mold 20.

As illustrated in FIG. 10, when the first mold 10 and the second mold 20 are fitted together, the sensor film 5 that is positioned using the positioning pins 26 is placed in the cavity C while a small amount of tension is applied to the sensor film 5 by the pressure of the molding projecting portion 23. An outer peripheral portion of the sensor film 5 is placed in the opposing gap T between the first mold 10 and the second mold 20.

Figure 11:
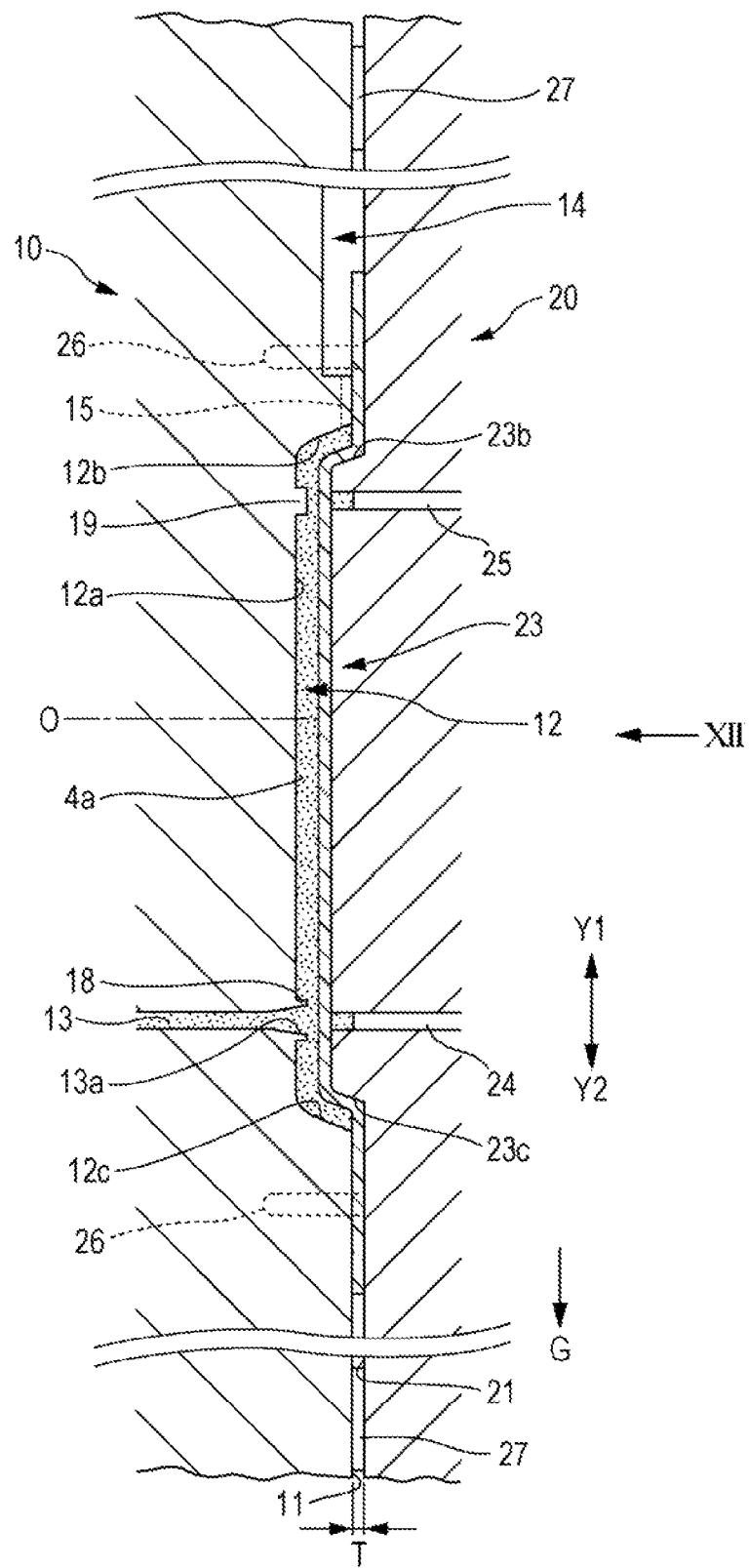
FIG. 11 is a sectional view illustrating a state where the molds are fitted together and a melted resin is injected into the cavity.

Subsequently, as illustrated in FIG. 11, a melted resin 4a made of, for example, PMMA is injected into the cavity C from the gate 13 of the first mold 10.

When the preheated sensor film 5 comes into contact with the melted resin 4a, the sensor film 5 is heated to a temperature that is almost the glass transition temperature to be softened and is pressed against the front surface of the molding projecting portion 23 by the injection pressure of the melted resin 4a. The sensor film 5 that is pressed against the front surface of the molding projecting portion 23 is likely to elongate in the plane direction. Here, since the sensor film 5 is not restrained inside the opposing gap T, the sensor film 5 easily elongates toward the outer periphery thereof. In this manner, the sensor film 5 that is pressed against the front surface of the molding projecting portion 23 can elongate relatively freely inside the cavity C and thus is less likely to become creased.

Figure 12:
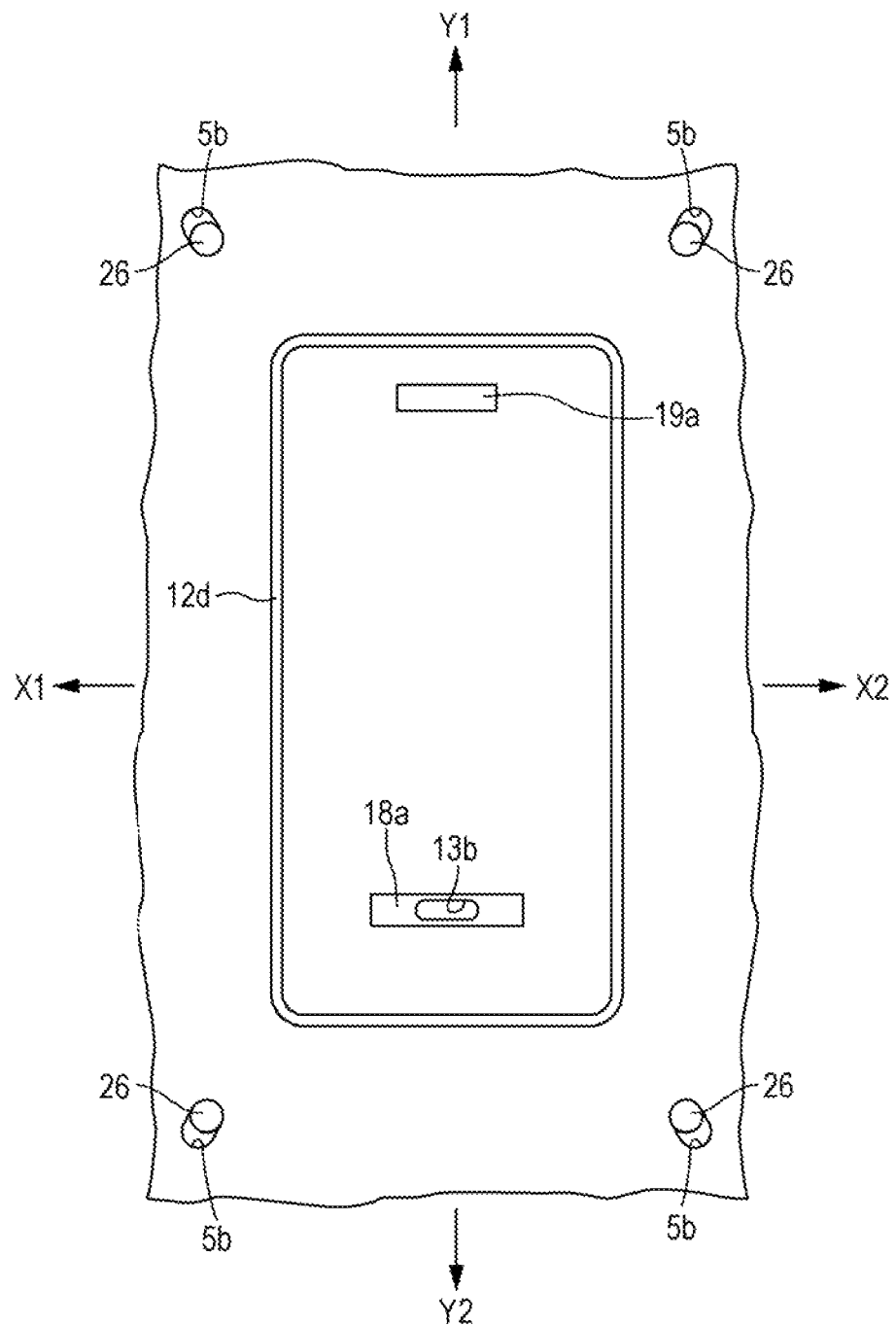
FIG. 12 is a front view of a molded product that is seen immediately after being removed from the second mold, in the arrow XII direction illustrated in FIG. 11.

By injecting the melted resin 4a into the cavity C, the shapes of the front surface 2 and the back surface 3 of the resin layer 4 are determined by the melted resin 4a and the sensor film 5. Furthermore, as illustrated in FIG. 12, the outer peripheral portion of the sensor film 5 that overruns the cavity C expands in the Y1, Y2, X1, and X2 directions. Here, since the base film 5a of the sensor film 5 is softened, the positioning holes 5b expand radially.

As illustrated in FIG. 12, the outer peripheral portion of the sensor film 5 is supported by the four positioning pins 26 with a uniform force in the corresponding directions when the outer peripheral portion expands in the Y1, Y2, X1, and X2 directions. Thus, the window portion 7c and the touch sensor portion 30 formed in the sensor film 5 can be kept being positioned in the center portion of the cavity C. As illustrated in FIG. 1, the transmissive region 7 and the touch sensor portion 30 are more likely to be positioned uniformly in the molded surface panel 1 with respect to the front-surface front portion 2a. It is preferable that the shape or size of the window portion 7c at the center of the decorative portion 6 and the shape or size of the electrode layers 31, the right wiring layers 32a, and left wiring layers 32b, be preset in consideration of probable elongation of the sensor film 5 at the time of injecting the melted resin.

The first mold 10 and the second mold 20 are vertically placed in line with the direction of gravity (G direction). Since the gate 13 is positioned to be sufficiently lower than the center O of the cavity C, the sensor film 5 is prevented from being creased.

As illustrated in FIG. 13A, in the stage where the first mold 10 and the second mold 20 are fitted together, the sensor film 5 crosses the inside of the cavity C between the lower-surface molding portion 12c and the lower-back-surface molding portion 23c. As illustrated in FIG. 13B, when the melted resin 4a is injected into the cavity C from the gate 13, the melted resin 4a flows down into a space between the lower-surface molding portion 12c and the lower-back-surface molding portion 23c according to the gravity, and the sensor film 5 is thus pressed against and along the front surface of the lower-back-surface molding portion 23c by the flow in the F1 direction. Since the gate 13 is positioned at a lower position, the flow of the melted resin 4a in the F1 direction is less likely to be disturbed. Thus, the sensor film 5 is closely attached to the lower-back-surface molding portion 23c without being creased.

As illustrated in FIG. 13C, when a lower portion of the cavity C is filled with the melted resin 4a and the sensor film 5 is closely attached to the lower-back-surface molding portion 23c, the melted resin 4a gradually rises in the Y1 direction. At this time, the sensor film 5 is upwardly attached to the center-back-surface molding portion 23a of the molding projecting portion 23 by the force of the flow of the melted resin 4a in the F2 direction.

While the melted resin 4a is rising in the cavity C, the air in the cavity C is output to the inside of the relief recess 14 through the air-exit paths 15 formed at an upper end portion of the molding recessed portion 12 of the first mold 10.

Since the sensor film 5 behaves in the above-described manner in the cavity C, the sensor film 5 is less likely to become creased and more likely to be closely attached to the front surface of the molding projecting portion 23.

FIGS. 14A to 14C illustrate a molding operation according to a comparative example in which a gate 13A is positioned to be close to an edge portion of the lower-surface molding portion 12c of the first mold 10. As illustrated in FIG. 14B, since the melted resin 4a that is injected into the cavity C from the gate 13A flows obliquely upward, or in the F3 direction, the sensor film 5 is more likely to become creased. As illustrated in FIG. 14C, the melted resin 4a that thereafter flows in the F4 direction lifts up the creased portion of the sensor film 5. Thus, the crease is highly likely to remain unsolved.

For this reason, a gate should be not disposed at a portion of the first mold 10 that faces a range from the opposing flat face 21 of the second mold 20 to a half point (H/2) at which the height H of the lower-back-surface molding portion 23c is halved.

After the melted resin 4a is fed to the cavity C and cooled down, the first mold 10 and the second mold 20 are detached from each other. By projecting the first release pin 24 and the second release pin 25 of the second mold 20, a molded product is detached from the molding projecting portion 23 of the second mold 20.

As illustrated in FIG. 12, the molded product removed from the molds 10 and 20 has a gate imprint 13b and an imprint of the first release pin 24 at a thin portion 18a that is formed by the first step portion 18 of the first mold 10. The molded product also has an imprint of the second release pin 25 at a thin portion 19a formed by the second step portion 19. The gate imprint 13b and the other imprints can be removed by forming the first opening 8 and the second opening 9 by punching out part of the resin layer 4 and the sensor film 5 at the thin portions 18a and 19a. The surface panel 1 is formed by further cutting part of the resin layer 4 and the sensor film 5 that overruns the cavity C.

In this embodiment, the transmissive electrode layer 31 is made of ITO. However, the electrode layer 31 may be formed of a transmissive conductive organic film made of, for example, polyethylenedioxythiophene (PEDOT). The conductive organic film is more flexible than ITO. Thus, the electrode layer 31 formed of the conductive organic film can be expanded beyond the border B3 to the region of the back-surface right portion 3d in the sectional view of FIG. 5. Accordingly, the right edge portion 7a and the left edge portion 7b of the transmissive region 7 can be made closer to or can be positioned on the back-surface right portion 3d and the back-surface left portion 3e, and thus a region in which the transmissive region 7 and the touch sensor portion 30 are formed can be further widened The method of manufacturing the surface panel 1 according to the present invention is not limited to the one according to the embodiment. For example, the sensor film 5 may be preformed so as to follow the shape of the back surface 3 of the resin layer 4 by compressed-air molding or vacuum molding, the preformed sensor film 5 may be inserted into a space between the molds, and then the melted resin 4a may be injected into the space.

The surface panel according to the present invention is not limited to being used as a casing of a mobile device according to the embodiment, and may be used as part of a remote controller for controlling electric products or a casing of other electronic devices.

What is claimed is:

1. A method of manufacturing a front panel including a front panel body formed of a single transmissive resin layer and a sensor film attached to the transmissive resin layer, the sensor film configured to sense presence of a human finger in proximity thereto, the method using a first mold having a molding recessed portion and a second mold having a molding projecting portion, the method comprising:
    providing a sensor film, including:
        a single-layered base film made of a transmissive material, having a first surface and a second surface opposite to the first surface;
        a transmissive electrode layer formed on the second surface in a center region thereof;
        a wiring layer formed on the second surface in a peripheral region surrounding the center region, the wiring layer connected to the transmissive electrode layer, the wiring layer being a conductive organic layer; and
        a decorative portion formed on the first surface, the decorative portion covering the wiring layer;
    placing a sensor film between the first mold and the second mold;
    joining the first mold and the second mold together such that a cavity is formed between the molding recessed portion and the molding projecting portion and the sensor film is placed on the molding projecting portion in the cavity; and
    injecting a melted resin into the cavity to form a single transmissive resin layer, the injecting the melted resin including:
        forming a front surface of the transmissive resin layer in a shape of the molding recessed portion; and
        forming a back surface of the transmissive resin layer along the sensor film in a shape of the molding projecting portion, thereby laminating the sensor film to the back surface of the transmissive resin layer,
    wherein the transmissive electrode layer is positioned in a first region corresponding to a back main surface of the transmissive resin layer, the wiring layer is positioned in a second region corresponding to at least one of a back right-side surface and a back left-side surface of the transmissive resin layer extending backward from the back main surface, the single-layered base film extends along the back main surface, the back right-side surface, and the back left-side surface, the decorative portion is provided on the first surface of the single-layered base film in the second region so as to hide the wiring layer viewed from the front surface, and the decorative portion, the single-layered base film, and the wiring layer form a three-layered structure in the second region, and
    wherein the transmissive electrode layer is disposed in a transmissive region surrounded by the decorative portion formed in a shape of a frame.

2. The method of manufacturing a front panel according to claim 1, wherein the injecting the melted resin further includes:
    pushing the sensor film against a surface of the molding projecting portion with the melted resin, such that the sensor film is in close contact with the surface of the molding projecting portion.

3. The method of manufacturing a front panel according to claim 2, wherein the first and second molds are disposed vertically during the injection such that a length direction of the cavity orthogonal to a direction in which the first mold and the second mold face each other coincides with a direction of gravity.

4. The method of manufacturing a front panel according to claim 3, wherein the melted resin is injected through a gate formed in the first mold in a position lower than a vertical middle point of the cavity.

5. The method of manufacturing a front panel according to claim 2, wherein the sensor film is allowed to elongate through the cavity between the first and second molds during the injection of the melted resin.

6. The method of manufacturing a front panel according to claim 1, wherein the first and second molds are disposed vertically during the injection such that a length direction of the cavity orthogonal to a direction in which the first mold and the second mold face each other coincides with a direction of gravity.

7. The method of manufacturing a front panel according to claim 6, wherein the melted resin is injected through a gate formed in the first mold in a position lower than a vertical middle point of the cavity.

8. The method of manufacturing a front panel according to claim 1, wherein the decorative portion is coated on the first surface of the base film.

* * * * *